J. V. SOHN.
FARM IMPLEMENT.
APPLICATION FILED JULY 12, 1915. RENEWED OCT. 5, 1916.
1,204,323.
Patented Nov. 7, 1916.
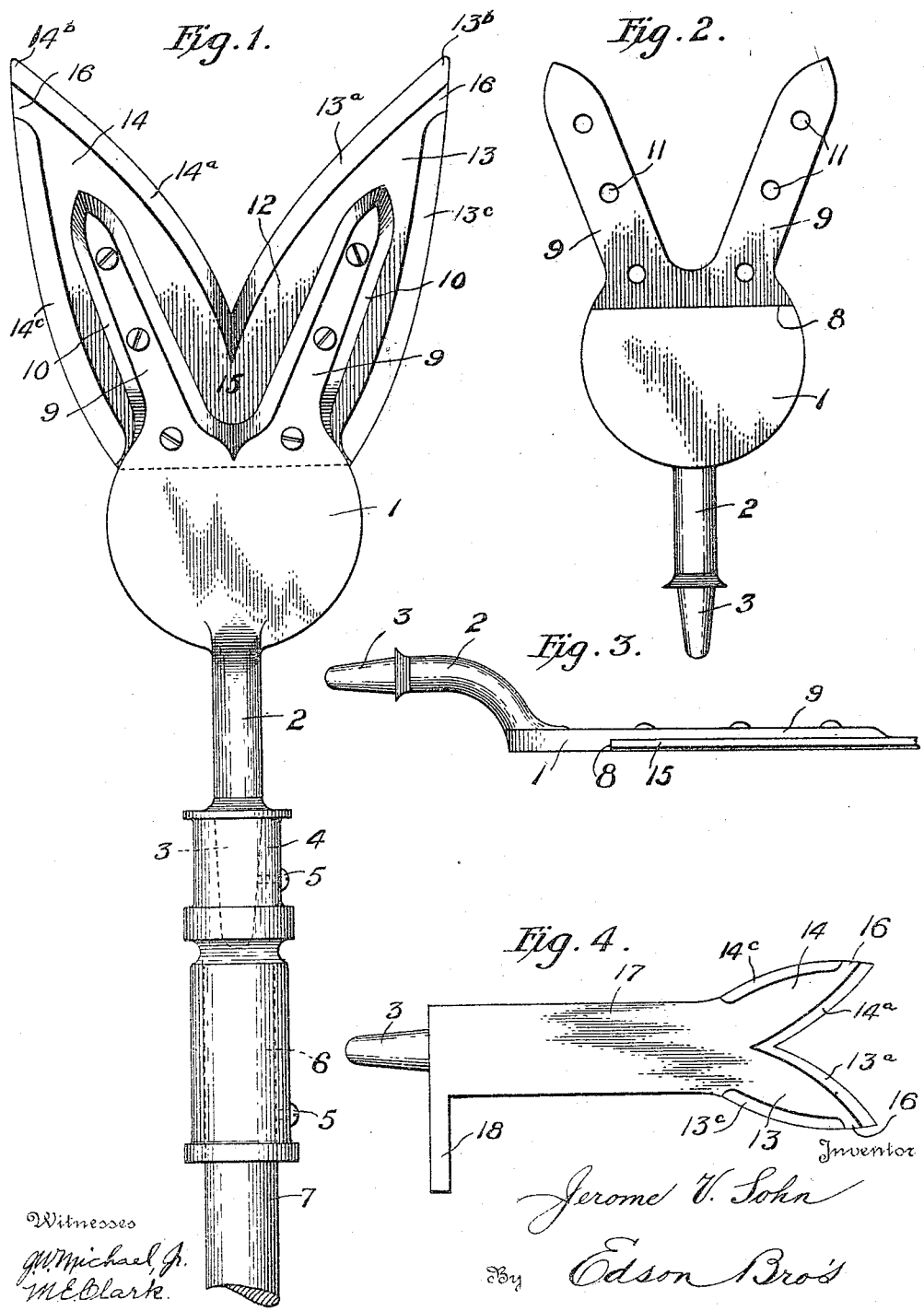

UNITED STATES PATENT OFFICE.

JEROME V. SOHN, OF SAYBROOK, ILLINOIS.

FARM IMPLEMENT.

1,204,323.

Specification of Letters Patent.

Patented Nov. 7, 1916.

Application filed July 12, 1915, Serial No. 39,275. Renewed October 5, 1916. Serial No. 123,942.

*To all whom it may concern:*

Be it known that I, JEROME V. SOHN, a citizen of the United States, residing at Saybrook, in the county of McLean and State of Illinois, have invented certain new and useful Improvements in Farm Implements; and I do hereby declare the following to be a full, clear, and exact description of the invention, such as will enable others skilled in the art to which it appertains to make and use the same.

This invention is a farm implement which is especially adapted for weeding and the like.

The improvements pertain to cutting blades which are removably secured to a supporting element or shank having a large bearing surface on the blade associated with a shoulder whereby the strains imposed upon the implement are not borne by the fastening means which secure the blade to the supporting element. The blade is provided with a plurality of members which form a substantially reëntering angle, and the side edges of the blade are sharpened to facilitate the cutting operation by the implement both in forward and rearward movements.

While different embodiments of the invention are disclosed in the accompanying drawings, it is to be understood that the constructions therein illustrated are for the purposes of illustration only, and not as defining the limits of the invention.

In the drawings—Figure 1 is a top plan view. Fig. 2 is a bottom plan view of the supporting element or shank, the cutting blade being removed. Fig. 3 is a side elevation, partly broken away. Fig. 4 is a detail view of an elongated cutting blade, the supporting blade being omitted.

The device is particularly adaptable for use in gardens in removing weeds or growing plants, and may be operated as a push hoe. Various types and sizes of blades may be applied to the supporting shank, and the shank may be supported and manipulated by a suitable handle. The shank is provided with a shoulder and a plurality of radiating arms, the shoulder abutting against the end of the blade whereby pressure may be exerted in a forward direction on the cutter, and the arms serving to firmly secure the blade to the shank and at the same time transmitting the force from the shank forwardly on the blade. The outer side edges of the blade are sharpened to facilitate the cutting of the implement in side movements and in rearward movements thereof, so that it is unnecessary to continually change the position of the forward cutting edge to effectually employ the instrument in a garden.

Referring more particularly to the embodiment of the invention disclosed in Figs. 1 to 3, the supporting element is indicated at 1 wherein the base is provided with a shank stem 2 having any suitable means, such as a tang 3, to support the element 1 through a socket member 4. If desired, suitable retaining means, such as a screw 5 may be passed through the socket member to engage the tang 3. This socket member 4 may also be provided with a socket indicated at 6, to receive an end 7 of a handle for the manipulation of the instrument.

The base of the supporting element 1 may be provided with a shoulder 8. Extending from the base is shown a plurality of arms 9, which may have beveled upper edges as at 10, to facilitate the passage of the implement through the soil. These arms 9 may be provided with a plurality of apertures 11, through which may be passed any suitable fastening means to engage a cutting blade 12.

The cutting blade illustrated in Fig. 1, is shown provided with a plurality of members 13 and 14, which are united at the central portion thereof 15, which central portion is adapted to abut against the shoulder 8. The blade members may be so arranged that they form a substantially salient and reëntering angle, with the converging part of the blades terminating in engagement with the shoulder 8. The arms 9 are adapted to rest upon the upper surface of the blade members, preferably at the central portions thereof, the arms being shown as extending outwardly toward the outer pointed ends of the blade members. The inner edges of the blade members are preferably sharpened as at 13$^a$ and 14$^a$, such sharpened portions extending from the central part at 15 to the outer ends 13$^b$ and 14$^b$. The edges of the blade members 13 and 14 may be curved as illustrated in the drawings, or any other preferred shape. The outer edges of these blade members may be sharpened as at 13$^c$ and 14$^c$, such sharpened edges extending from a point slightly to the rear of the ends 13$^b$ and 14$^b$ respectively to the base of the supporting element 1, thereby producing an inwardly curved cutting edge, permitting the implement to be used as a cutter on the rearward stroke, should the device be used similar to a hoe.

If desired, a portion of the edge, indicated at 16, on each of the blade members, may be left unsharpened, to strengthen the ends of the blade members by leaving thickened material at these parts.

In Fig. 4, the supporting element is omitted, and the cutting implement is shown provided with an elongated shank 17 having the tang 3 as in the construction of Figs. 1 to 3 to be engaged by the handle socket 4. This shank 17 may be provided with a foot rest 18. In this construction the implement may be used for cutting roots and digging weeds when it is desired to drive the implement deeply into the surface of the ground.

It is obvious that various changes in the form of the blade and in the proportions of the device may be made to adapt the invention to various uses, and the right is reserved to make such changes and alterations as fairly fall within the scope of the appended claims.

Having thus described my invention, what I claim as new and desire to secure by Letters Patent, is:

1. A farm implement comprising a blade having a plurality of members arranged to form a substantially salient and reëntering angle, the inner converging edges of said blade members being sharpened, and the outer edges of said members being sharpened while the rear portion of the blade is unsharpened to provide an abutting edge.

2. A farm implement comprising a blade having a plurality of flared members, the inner and outer edges of which are curved and sharpened and a central rear non-sharpened member.

3. A farm implement having a bifurcated blade, the inner and outer edges of which are sharpened except at a part adjacent the outer ends thereof.

4. A farm implement comprising a blade, the supporting element for said blade having a plurality of radiating arms adapted to engage the upper surface of the blade, and means to secure the blade to the supporting element.

5. A farm implement comprising a blade, a supporting element having a shoulder adapted to abut against the blade and a plurality of arms to rest upon the surface of the blade, the arms extending outwardly toward the ends of the blade.

6. A farm implement comprising a bifurcated blade, a supporting element having a broad heel terminating in a shoulder against which the blade abuts, a plurality of arms radiating from the supporting element and adapted to rest upon the surface of the blade, means to secure the blade to said arms, and means to secure the supporting element to a handle.

7. In a farm implement a bifurcated blade comprising sharpened outer and inner edges, an elongated shank, a foot rest near one end of the shank, and means to secure the blade to a support.

In testimony whereof, I affix my signature, in presence of two witnesses.

JEROME V. SOHN.

Witnesses:
RUTH L. SAILOR,
J. E. WYCKOFF.